(12) United States Patent
Chiabrando et al.

(10) Patent No.: US 12,187,453 B2
(45) Date of Patent: Jan. 7, 2025

(54) AIRCRAFT WITH A COMBUSTION ENGINE HAVING AN EXHAUST AHEAD OF ITS AIR INTAKE

(71) Applicant: AIRBUS OPERATIONS, S.L.U., Madrid (ES)

(72) Inventors: Marcos Javier Chiabrando, Madrid (ES); Pio Fernandez-Lopez, Madrid (ES); Alvaro Joaquin Rodriguez Hidalgo, Madrid (ES)

(73) Assignee: AIRBUS OPERATIONS, S.L.U., Madrid (ES)

( * ) Notice: Subject to any disclaimer, the term of this patent is extended or adjusted under 35 U.S.C. 154(b) by 81 days.

(21) Appl. No.: 17/954,079

(22) Filed: Sep. 27, 2022

(65) Prior Publication Data
US 2023/0099948 A1    Mar. 30, 2023

(30) Foreign Application Priority Data
Sep. 28, 2021    (EP) .................................... 21382866

(51) Int. Cl.
*B64D 41/00*    (2006.01)
*B64D 33/02*    (2006.01)

(52) U.S. Cl.
CPC ............. *B64D 41/00* (2013.01); *B64D 33/02* (2013.01); *B64D 2033/0213* (2013.01); *B64D 2041/002* (2013.01)

(58) Field of Classification Search
CPC ............ B64D 2033/0213; B64D 41/00; B64D 2041/002
See application file for complete search history.

(56) References Cited

U.S. PATENT DOCUMENTS

| | | | | |
|---|---|---|---|---|
| 3,489,377 A | * | 1/1970 | Wright | F02K 1/827 137/15.1 |
| 6,092,360 A | * | 7/2000 | Hoag | F02C 7/32 60/39.83 |
| 6,651,929 B2 | * | 11/2003 | Dionne | F02C 7/14 165/44 |
| 8,245,976 B2 | * | 8/2012 | Sakurai | B64C 21/02 244/58 |
| 8,438,829 B2 | * | 5/2013 | Negulescu | F02K 3/072 416/129 |
| 8,484,894 B2 | * | 7/2013 | Sakurai | B64C 21/02 49/73.1 |
| 9,254,924 B2 | * | 2/2016 | Nager | B64D 41/00 |
| 10,605,253 B2 | * | 3/2020 | Hoover | F04D 17/10 |

(Continued)

FOREIGN PATENT DOCUMENTS

EP    2 208 669    7/2010

OTHER PUBLICATIONS

The Extended European Search Report cited in EP 21382866.8, dated Mar. 7, 2022, , 5 pages.

*Primary Examiner* — Joseph W Sanderson
(74) *Attorney, Agent, or Firm* — Nixon & Vanderhye P.C.

(57) ABSTRACT

An aircraft (41) including a fuselage (14) having a skin (15) and extending along a longitudinal axis (39) from a front end to a rear end (17) of the aircraft, and an engine (30) including an air intake (31) forming an opening in the skin (15) and an exhaust (32) forming another opening in the skin (15). The engine is in a rear fuselage section, in which the exhaust (32) is situated ahead of the air intake (31) along the longitudinal direction (39).

20 Claims, 5 Drawing Sheets

(56) References Cited

U.S. PATENT DOCUMENTS

| | | | | |
|---|---|---|---|---|
| 10,967,983 B2* | 4/2021 | Dionne | ............ | F02M 35/10262 |
| 11,142,330 B2* | 10/2021 | Papas | ...................... | F02K 3/062 |
| 2003/0080244 A1* | 5/2003 | Dionne | .................. | B64D 33/08 |
| | | | | 244/57 |
| 2010/0181435 A1* | 7/2010 | Sakurai | ................... | B64C 21/08 |
| | | | | 244/209 |
| 2010/0212285 A1* | 8/2010 | Negulescu | .............. | F02K 3/025 |
| | | | | 416/129 |
| 2012/0151933 A1 | 6/2012 | Ouplomb | | |
| 2012/0280088 A1* | 11/2012 | Sakurai | ................ | B64C 21/025 |
| | | | | 49/506 |
| 2013/0037122 A1* | 2/2013 | Nager | .................... | B64D 41/00 |
| | | | | 137/15.1 |
| 2016/0102634 A1* | 4/2016 | Suciu | ................... | F01D 13/003 |
| | | | | 60/262 |
| 2019/0161211 A1* | 5/2019 | Arana Hidalgo | ...... | B64D 27/02 |
| 2019/0162197 A1* | 5/2019 | Hoover | .................... | F02C 9/18 |
| 2020/0070995 A1* | 3/2020 | Papas | ..................... | B64D 35/00 |
| 2020/0385138 A1* | 12/2020 | Dionne | ................ | F02M 35/024 |
| 2021/0206502 A1 | 7/2021 | Boufford et al. | | |
| 2021/0284352 A1* | 9/2021 | Papas | ..................... | B64D 33/04 |

\* cited by examiner

AIRCRAFT WITH A COMBUSTION ENGINE HAVING AN EXHAUST AHEAD OF ITS AIR INTAKE

RELATED APPLICATION

This application incorporates by reference and claims priority to European Patent Application 21382866-8, filed Sep. 28, 2021.

FIELD OF INVENTION

The invention relates to aircraft with a combustion engine in the fuselage. More particularly, the invention relates to commercial aircraft with an auxiliary power unit in a rear fuselage section.

BACKGROUND OF INVENTION

In current commercial aircraft, engine exhaust gases are exhausted towards the rear of the aircraft. This is particularly the case for auxiliary power unit (APU) engines that are traditionally located in a rear section of a fuselage. Exhaust from APU engines are exhausted at the very rear end of the fuselage. The exhaust gases of an engine are exhausted towards the rear of the aircraft and, particularly rearward from the air intake of the engine, to avoid having the air intake for an engine suck in exhaust gases from the engine.

The exhaust from APU engines are effectively discharged rearward and away from intake for the engine while the aircraft is stopped or operating at slow speeds, such as while on the ground. At higher speeds, such as during flight, the exhaust from an APU engine may, due to reverse flow effects, flow into the air intake for the engine. Ingesting exhaust gas can decrease the efficiency of the APU engine, degrade the operational life of the engine and increase maintenance costs for the engine.

APU engines have in the past not been operated during aircraft flight except in exceptional circumstances, such as during loss of a main aircraft engine. Carrying an APU engine, which remains off during most or all of a flight, is not optimal because the APU engine is heavy and thus reduces the allowable weight for passengers and/or cargo that can be carried by the aircraft and reduces the fuel-burn efficiency of the aircraft.

To improve the energy efficiency of commercial aircraft, efforts are made to use the APU engine as source of energy during flight. The power provided by the APU engine reduces the power required from the main aircraft engines, which allows the main aircraft engines to be smaller and have less weight than main engines that provided all of the power needed in an aircraft during flight. Thus, using APU engines during flight may increase the fuel-burn efficiency of an aircraft and reduce the energy consumption of an aircraft during flight.

However, operating an APU engine during all or most of a flight present difficulties to the operation of the APU engine, especially at high altitudes and high air speeds. One such difficulty is the above-mentioned tendency of exhaust gas from an APU engine being ingested into the air intake of the engine during flight.

SUMMARY OF INVENTION

The invention aims to provide an aircraft with a high aerodynamic efficiency. The invention also aims to provide an aircraft with an efficient engine, particular, an efficient auxiliary power unit engine. Also, the invention aims to provide an aircraft with an auxiliary power unit that may be used during different phases of flight of an aircraft.

In the invention, the exhaust opening for an engine mounted in a rear fuselage section, is ahead of the air intake opening. Thus, the exhaust opening is closer to the front of the rear fuselage section than is the air intake opening. Similarly, the distance between the air intake opening and the rear of the rear fuselage section is shorter than the distance between the exhaust opening and the rear of the rear fuselage section.

Conventional wisdom teaches that positioning the air intake opening of a rear mounted APU engine rearward of an exhaust opening will cause exhaust gas to flow from the exhaust opening rearward to the intake opening and then ingested by the air intake. Moreover, positioning the air intake opening rearward of the exhaust opening is actually likely to increase the amount of exhaust gas ingested into the air intake during aircraft ground operations or during slow speed operations. The invention defies conventional wisdom by positioning an air intake opening of a rear mounted engine rearward of the exhaust opening of the engine. The inventors recognized that positioning the air intake opening on a rear fuselage section rearward of the exhaust opening may avoid having exhaust gas enter the intake opening while the aircraft is in a cruise phase of a flight, and that the risk of exhaust gases being ingested while the aircraft on the ground may by outweighed by the benefits of operating the engine during cruising.

The inventors evaluated aerodynamic pressure profiles on the skin of the rear fuselage section during flight of an aircraft, including at the high speeds encountered during a cruise portion of a flight. The inventors discovered that during flight, such as during cruise, the dynamic air pressure on the skin of the rear fuselage section is higher at the rear end of the rear fuselage section than along the sides of the rear fuselage section. Gases flow from areas of high dynamic air pressure towards areas of low dynamic air pressure. Thus, the inventors discovered that gases may flow from the rear end of a fuselage section forward along the sides of a fuselage section during flight, such as during cruse which is a high speed, high altitude flight.

The inventors determined that placing the air intake opening at or near the rear end of the rear fuselage section reduces or eliminates having exhaust gases entering the air intake because of the high dynamic pressure at the rear end prevents exhaust gases from entering the intake. Similarly, positioning the exhaust opening on the side of the rear section and forward of the air intake opening places the exhaust opening at an area of low dynamic pressure. Gases tend to flow from areas from high dynamic pressure towards areas of low dynamic pressure. Thus, positioning an exhaust opening in an area of low dynamic pressure ensures that the exhaust gases do not flow towards an area of higher dynamic pressure where the air intake is positioned.

The invention may be embodied as an aircraft comprising: a fuselage extending along a longitudinal axis from a front end to a rear end, said fuselage comprising a skin; an engine; an air intake for the engine forming an opening in the skin, an exhaust for the engine forming an opening in the skin and located in a rear fuselage section of the fuselage, wherein the exhaust is ahead of the air intake along the longitudinal direction.

The aircraft has a normal direction of flight, and in the whole text, terms such as front, fore, forward, ahead, behind, backward, rear or aft are to be understood along a longitudinal axis of this aircraft according to this normal direction of flight. For example, the cockpit is situated at the fore of the aircraft, while a stabilizer is at the aft of the aircraft, such that the cockpit is situated ahead of the stabilizer.

In the invention, the rear fuselage section has a front end facing toward a front of the aircraft, and a rear end facing a rear of the aircraft. In some embodiments, the rear end of the rear fuselage forms the rear end of the fuselage and/or of the aircraft.

The engine, e.g., an APU engine, is a combustion engine which ingests air from the atmosphere, mixes the air with fuel, combusts the mixture and exhausts combustion gases. The engine is connected to an air intake duct having an air intake opening at the skin of the fuselage. The air intake duct directs atmosphere into the engine. An exhaust duct directs exhaust from the engine to an exhaust opening on the skin of the fuselage.

Another feature of an embodiment of the invention is a segregating angle between an exhaust vector and an intake vector. The exhaust vector is a vector between a predetermined point on the longitudinal axis of the aircraft and exhaust opening. The intake vector is a vector between the predetermined point on the longitudinal axis of the aircraft and the air intake opening. The segregating angle is between the exhaust and intake vectors and may have a minimum value of 85 degrees, 90 degrees, 120 degrees or 180 degrees. This minimum angle of the segregate angle is to ensure that there is sufficient longitudinal distance and/or radial distance between the exhaust opening and the air intake opening to minimize or entirely avoid exhaust gases being ingested into the air intake.

The segregating angle may alternatively between an exhaust plane and an intake plane. The exhaust plane includes the longitudinal axis of the aircraft and a point on the exhaust opening. The intake plane includes the longitudinal axis of the aircraft and a point on the air intake opening. The exhaust plane may contain the exhaust vector, and the intake plane may contain the intake vector.

To achieve a segregating angle of 90 degrees or more, the air intake opening may be on a lateral side of the fuselage and the exhaust opening may be on another lateral side of the fuselage. For example, the air intake opening or exhaust opening may be on the port or starboard side of the rear section of the fuselage, and the other of the exhaust opening and air intake opening is on the other of the starboard and port side of the rear section.

In a further embodiment of the invention, the air intake opening and the exhaust opening are separated by a physical separator protruding from the skin of the fuselage. The physical separator may be one of the horizontal tail planes of the rear fuselage section, the vertical tail plane of the rear fuselage section or a fin mounted to the skin of the rear fuselage section that is parallel to the longitudinal axis of the fuselage. The physical separator diverts the flow of exhaust gases away from the air intake opening because the physical separator separates the exhaust flow away from the flow of fresh atmospheric air flowing into the air intake opening.

In an embodiment of the invention, the air intake opening is radially separated from the exhaust opening. The degree of radial separation is an angle in a plane of a cross-section of the rear section perpendicular to the lateral axis of the rear section. Increasing the radial separation reduces the amount of exhaust gas ingested by the air intake. Also, the radial separation may be used to position a physical separator, such as one of the horizontal tail planes or the vertical tail plane, between the exhaust opening and the air intake opening.

The horizontal tail plane or the vertical tail plane may form a physical separator between the air intake and the exhaust. The air intake opening and the exhaust opening may each be separated from nearest horizontal tail plane or vertical tail plane by a predetermined distance selected to minimize disturbances caused by the opening to air flow around the horizontal tail plane or the vertical tail plane and to avoid damaging the horizontal tail plane or the vertical tail plane with hot exhaust gases.

Nonetheless, in some embodiments of the invention, the air intake opening and the exhaust opening are aft of the horizontal tail plane and the vertical tail planes of the aircraft.

The air intake opening may be on a lateral side of the rear fuselage section. The air intake opening may be between two planes each including the longitudinal axis of the aircraft oriented in a range of positive (+) 50 degrees to negative (−)50 degrees, or in a range of positive (+)30 degrees and negative (−)30 degrees, with the longitudinal axis of the aircraft. The air intake opening may be on a port or starboard side of the rear fuselage section.

The air intake opening may comprise a scoop facing forward and adapted to divert air flowing along the fuselage during flight into the intake duct. The scoop may be adapted to at least partially close the air intake opening when the engine, e.g., an APU engine, is off.

Alternatively or in combination, the air intake opening may comprise a flap to at least partially close the air intake opening when the engine is switched off. The flap may open towards the inside of the intake opening. Further, the air intake opening may include a filter covering the opening and configured to filter sand and other debris from being ingested into the air intake duct.

The exhaust opening may be on an upper side or a lower side of the rear fuselage section. The exhaust opening may be comprised between two planes that each include the longitudinal axis of the aircraft and form respectively an angle in a range of positive (+) 50 degrees to negative (−)50 degrees, or in a range of positive (+)30 degrees to negative (−) 30 degrees with respect to a vertical line.

If the air intake opening is on a lateral side of the rear fuselage section, the exhaust opening may be on the upper side or lower side to ensure that the exhaust gases do not mix with fresh air drawn in through the air intake opening.

The exhaust opening may comprise vanes adapted to guide exhaust gases towards the atmosphere and away from the fuselage, such as during flight. The vanes may also direct the exhaust gases away from the air intake.

The engine may be an engine in an auxiliary power unit (APU) in a rear section of the fuselage.

In commercial aircraft, such as commercial passenger airliners, the auxiliary power unit(s) (APU) includes a combustion engine in the rear fuselage section. The APU provides power to the aircraft while on-ground such as to start one or more of the main engines. The APU may also provide emergency power to the aircraft during flight in case of failure of one or more of the main engines. Further, the APU may be operated during an entire flight, or during most of a flight, to provide power to the aircraft for purposes other than for thrust to propel the aircraft during flight.

The placements disclosed herein for the air intake opening and exhaust opening configuration are beneficial, especially for APU engines, position the air intake opening at a position of higher dynamic pressure than is the exhaust opening, during certain aircraft operational modes such as during cruise flight. Positioning the openings for the air intake and exhaust in this manner minimizes exhaust gases being ingested into the air intake during the certain aircraft operations which may increase the fuel efficiency of the engine during flight.

The auxiliary power unit engine has an APU longitudinal axis that may be offset from the longitudinal axis of the aircraft by, for example, at least 10 degrees. For example, the APU engine may have an inclination of at least 10 degrees with respect to the longitudinal axis of the aircraft, such that the exhaust of the engine is at an upper half of the rear section of the fuselage. In this embodiment, the front end of the auxiliary power unit may be placed higher than a rear end of the auxiliary power unit. Alternatively, the APU engine may be tiled downwards such that its exhaust is in the lower half of the rear section.

The rear of the rear fuselage section may be closed and the exhaust outlet of the engine, e.g., the APU engine, is on a side of the rear fuselage section. Alternatively, the rear of the rear fuselage section may be open and form the exhaust opening.

In an aircraft embodying the invention, the rear fuselage section has a closed tail cone. Closed tail cones tend to be aerodynamically more efficient than tail cones with exhaust openings at the rear end of the cone. The closed end of the closed tail cone allows air to flow with low drag around the end of the rear fuselage section and rejoin the atmospheric air behind the aircraft with minimal vortices. Also, the invention may be used to allow the manufacturing and the design of the tail cone to be optimized, such as for aerodynamic performance, without a constraint of adding an exhaust opening at the end of the tail cone. For example, the closed tail cone may have an end with a conical shape or a concave parabolic shape.

An aircraft embodying the invention may comprise an intake duct between the air intake opening and the engine, wherein the intake duct has apportion that is U-shape. The intake duct may include a first portion having an intake at the air intake opening, wherein the first portion is aligned with the airflow entering the opening or at a small angle to the airflow, such as within ten degrees of the airflow direction. The U-shape portion of the intake duct connects to a downstream end of the first portion of the duct and turns the air flowing through the duct towards the air inlet to the engine. The U-shaped portion allows for the first portion of the intake duct to be aligned with or oriented at a small angle to the air entering the air intake opening and turns the air flowing through the opening towards engine that may be forward of the longitudinal position of the air intake opening along the longitudinal direction of the aircraft. The U-shape section of the intake duct may also be applied in a duct that connects an air intake opening also allows the air to come in the engine on the opposite side of a rear fuselage section from the air intake opening. For example, an air intake duct with a U-shaped section may be used if the air intake opening is on the port side of the fuselage and the air intake opening is on a starboard side of the rear section.

In other embodiment, the air intake duct may be straight from the air intake opening to the engine. A straight air intake duct may have reduced weight and volume, and less aerodynamic drag as compared to a duct with a U-shaped section.

The air intake duct may comprise a divergent plenum to stabilize the airflow and increase the dynamic pressure of the air as the air enters the engine.

The invention also extends to other possible combinations of features described in the above description and in the following description relative to the figures. In particular, the invention extends to an aircraft rear fuselage section comprising features described in relation to the aircraft.

SUMMARY OF DRAWINGS

Some specific exemplary embodiments and aspects of the prior art and the invention are described in the following description in reference to the accompanying figures.

FIG. 4 is a schematic lateral view representation of a longitudinal cross-section of a rear section fuselage of the first embodiment of FIG. 3a.

DETAILED DESCRIPTION

Figure 1:
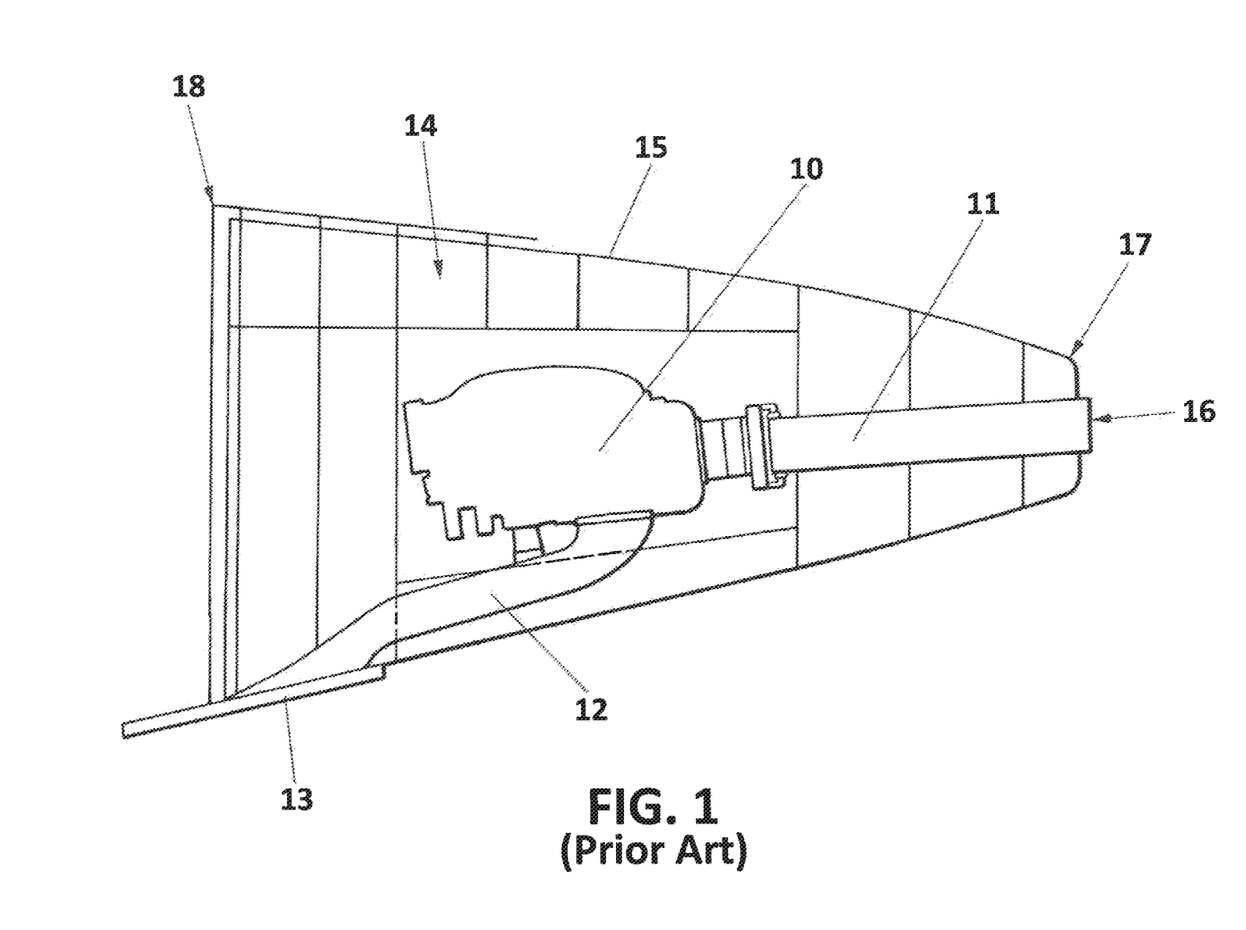
FIG. 1 is a schematic lateral view representation of a longitudinal cross-section of a rear section fuselage of an aircraft of the prior art.

FIG. 1 shows a rear fuselage section of a fuselage 14 of the prior art is represented. It comprises a skin 15 defining the envelope of the fuselage. The rear fuselage section extends between a rear end 17 and a front end 18 at which it is attached with another section of the fuselage 14. The rear fuselage section hosts a combustion engine 10. The combustion engine is in an auxiliary power unit (APU). The combustion engine may be a gas turbine engine driving a power output shaft that provides mechanical rotational power to drive an electric generator or mechanically driven systems in the aircraft.

The rear fuselage section may include, at its rearward end, a tail cone and mounts, or at least portions of a mount, for a vertical tail plane and horizontal tail planes. The front end of the rear fuselage section may be defined by a frame (former) and forward of the compartment within the fuselage for the APU. The rear end 17 may be a rear of a tail cone of the fuselage.

The APU engine 10 produces exhaust gases that are discharged through an exhaust opening 16 forming in the skin 15 at the rear end of the fuselage 14. The exhaust outlet 16 is connected to the engine through an exhaust duct 11. The exhaust 16 is situated at the rear end 17 of the rear fuselage section and forms the rear end of the aircraft. One may note that the shape of the rear end 17 is mainly determined to host the exhaust 16. The shape of the rear end 17 is not optimal in terms of aerodynamics.

The APU engine 10 ingests atmospheric air entering the aircraft through an air intake opening 13 forming an opening in the skin 15 of the fuselage 14. The air intake opening 13 is connected to the engine via an intake duct 12. The air intake opening is located on a lower side of the aircraft fuselage 14, towards the front of the rear fuselage section. The air intake opening 13 is far ahead of the exhaust opening 16 to avoid exhaust gases being ingested by the engine 10 through the air intake opening 13. Nonetheless, as it will be shown in connection with FIG. 2, the dynamic air pressure profile around the rear fuselage section when the aircraft is in flight may provoke exhaust gases to flow along the skin and into the air intake opening 13.

Figure 2:
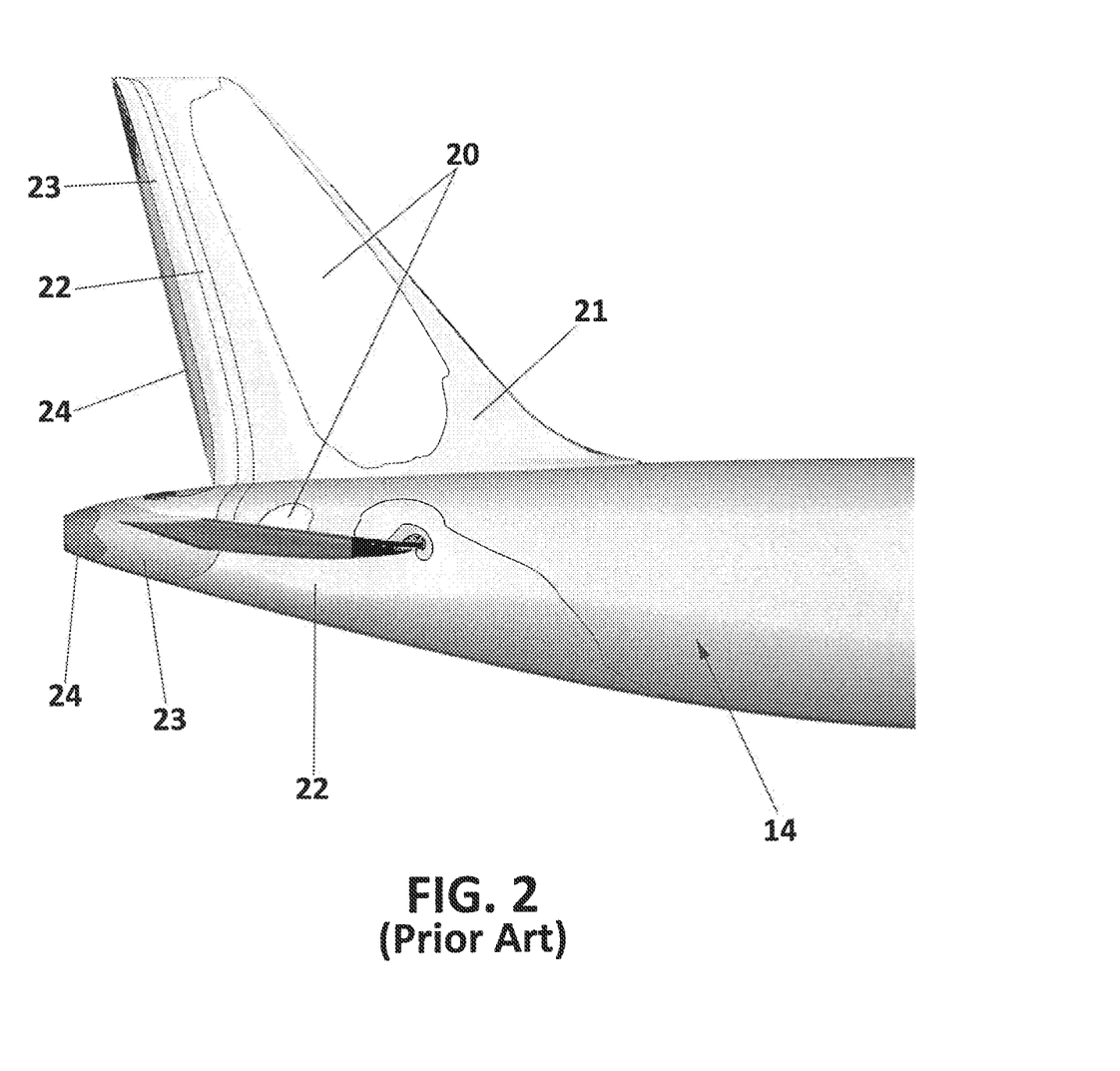
FIG. 2 is a schematic lateral view representation of pressures profiles around an aircraft of the prior art.

FIG. 2 shows an exemplary pressure profile of air in flight conditions around the skin of a rear fuselage section. The rear section includes a horizontal tail plane 26 and vertical tail plane 25. Each line delimits two areas of the skin with different pressure levels. A first area 20 has a lower dynamic air pressure than the areas 22, which themselves have a lower dynamic air pressure than the area 23. The skin of area 23 has a lower dynamic air pressure than the areas 24.

The areas 24 are situated at the rear of the vertical tail plane 25 and of at the rear end of the fuselage 14. The dynamic pressure at the location of the air intake opening 13 is lower than the pressure at the exhaust opening 16. Due to the lower dynamic pressure in area 24 that includes the exhaust opening, air and exhaust gases will flow along the skin of the rear fuselage section towards the air intake opening, in the arrangement shown in FIG. 1 of the exhaust opening and the air intake opening. Because exhaust gases flow to the air intake opening 13, the APU engine 10 will ingest exhaust gases which reduces the fuel efficiency of the engine causing the engine to burn additional fuel to compensate for the reduced efficiency.

Figure 3A:
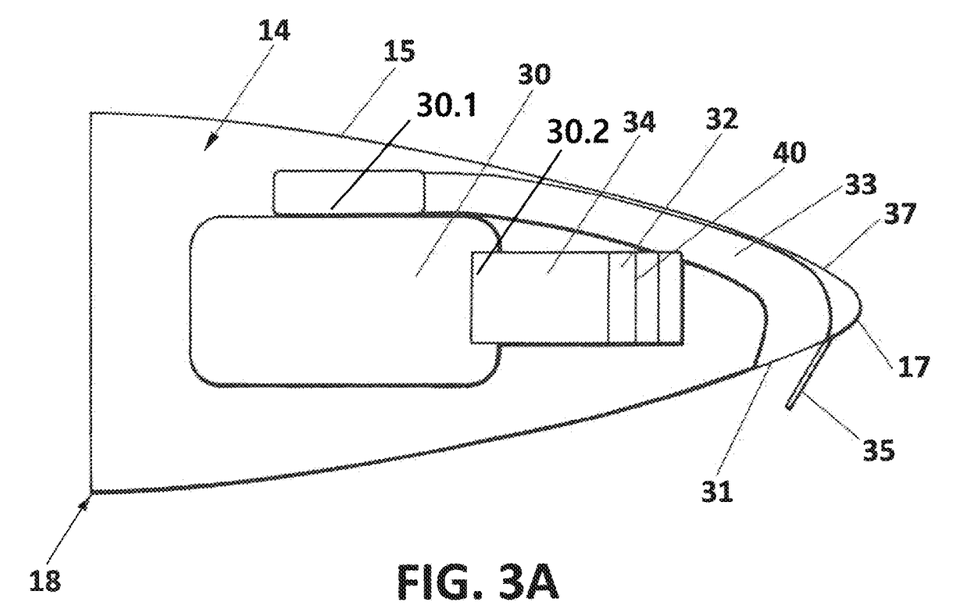
FIG. 3A is a schematic top-view representation of a longitudinal cross-section of a rear section fuselage of a first embodiment according to the invention.
Figure 3B:
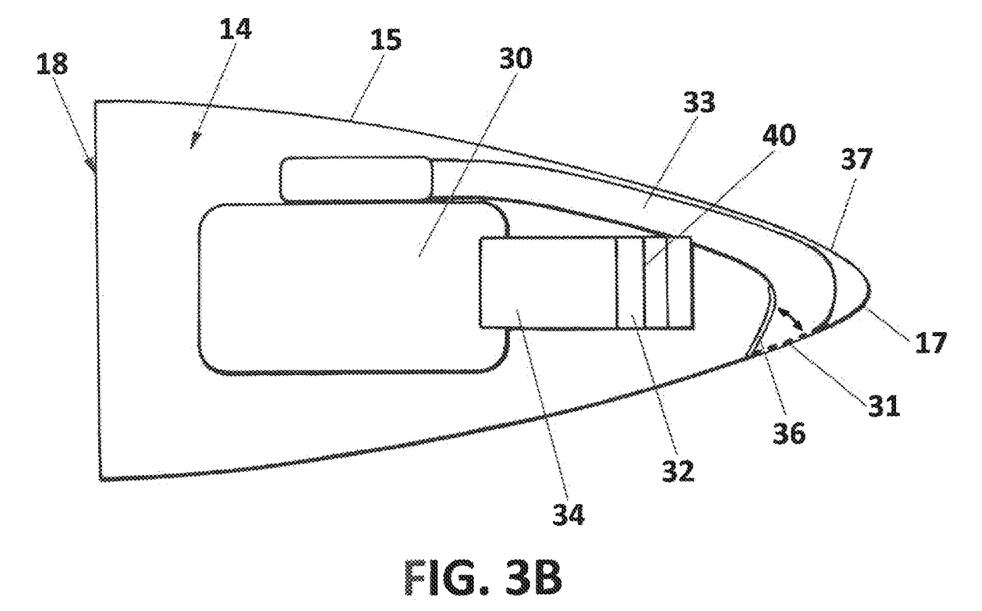
FIG. 3B is a schematic top-view representation of a longitudinal cross-section of a rear section fuselage of a second embodiment according to the invention.
Figure 4:
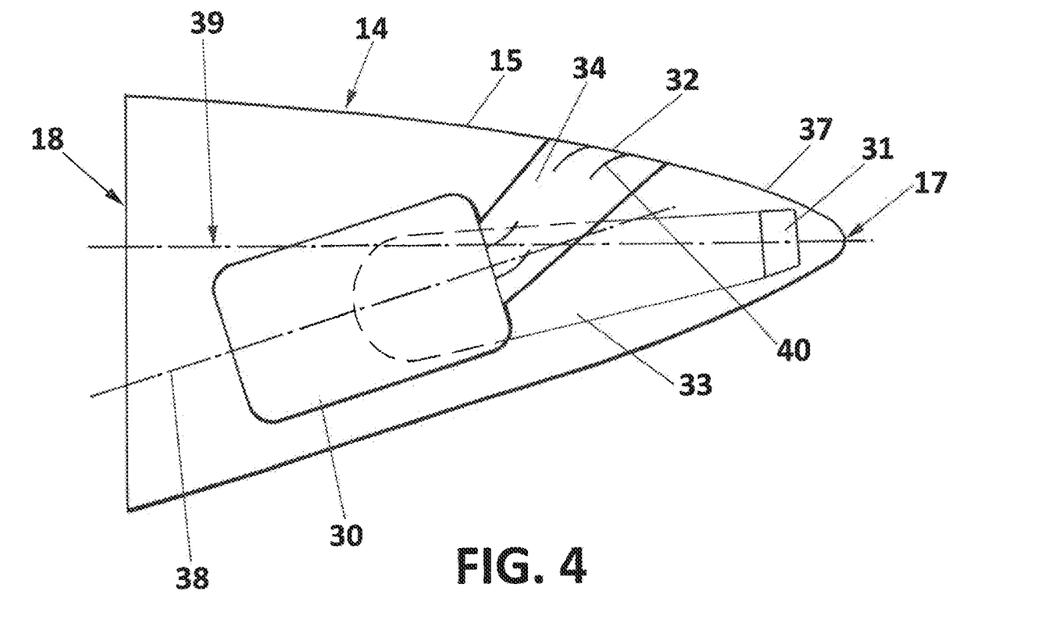
Figure 5:
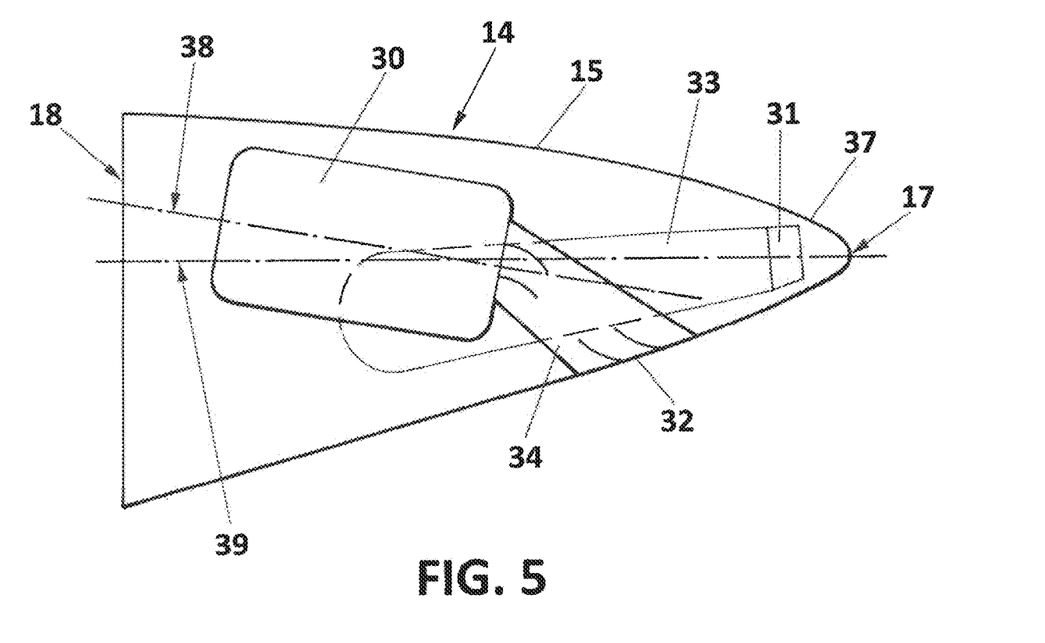
FIG. 5 is a schematic lateral view representation of a longitudinal cross-section of a rear section fuselage of a third embodiment according to the invention

FIGS. 3A and B show an embodiment of the invention. FIGS. 4 and 5 show other embodiments of the invention.

In the embodiment shown in FIGS. 3A and 4, an engine 30, e.g., an APU engine, is installed in a rear fuselage section of an aircraft's fuselage 14.

The engine 30 comprises an air intake opening 31 in the skin on a port side of the rear fuselage section. The air intake opening 31 intersects with a horizontal plane that includes the longitudinal axis 39 of the aircraft. The air intake opening 31 directs atmospheric air into an air intake duct 33 which directs the air into the engine air intake 30.1 of engine 30.

In FIGS. 3A and 4, the engine 30 is forward, along the length of the rear fuselage section, of both the air intake opening 31 and the exhaust outlet 32. Moreover, the air exhaust outlet 32 is forward, along the length of the rear fuselage section, of the air intake opening 31.

The air intake duct 33 directs air entering the air intake opening to the engine 30. The air intake duct 33 may be curved, as shown in FIG. 3A. In particular, the air intake duct, shown in FIG. 3A, a U-shaped section downstream of the opening 31 and upstream of a generally straight section of the duct that is directly connected to an air inlet of the engine. A first portion of the intake conduct 33 extends rearward in the fuselage from the air intake 31 opening to the U-shaped section. The U-shaped portion is a second portion of the intake duct and is curved to redirect air towards the front of the aircraft and towards the engine 30. A third portion of the intake duct 33 is immediately downstream in the duct from the second portion and extends towards the front of the fuselage to the engine.

The first portion may be arranged to minimize the angle formed by an axis of the first portion of the intake duct 33 with the natural air flow direction along the fuselage just before air enters the air intake opening 31. Minimizing this angle reduces the pressure loss of the air in the first portion due to the air turning from flowing over the skin to enter the intake opening 31 and flow into the first portion. Reducing the pressure loss through the air intake duct ensures that the dynamic pressure of the air reaching the engine is at the same pressure or only slightly less than the dynamic pressure of the atmospheric air at the skin of the fuselage. This ensures that the air flowing through the duct 33 into the engine has a relatively high energy which improves the fuel efficiency of the engine.

The engine 30 generates exhaust gases that are discharged from the aircraft through the exhaust opening 32. This opening may be on an upper side of the fuselage 14, as is shown in FIG. 4, on a lower side as shown in FIGS. 3A, 3B and 5, or at the rear end 17 of the tail cone of the rear fuselage assembly.

The exhaust opening 32 may intersect a vertical plane that includes the longitudinal axis 39 of the aircraft. The exhaust opening 32 forms the outlet of the exhaust duct 34. The exhaust from the engine exhaust outlet 30.2 flows into the inlet of the exhaust duct 34.

In the embodiments shown in FIGS. 3A, 3B, 4 and 5, the center of the air intake opening 31 is offset by about 90 degrees, such as within 10 degrees of 90 degrees, to the center of the exhaust outlet 32. This offset is with respect to a plane perpendicular to the longitudinal axis 39 of the aircraft.

The exhaust opening 32 is forward of the air intake opening 31, such that is the exhaust opening 32 is closer to the front of the aircraft than the air intake 31. The distance that the exhaust opening 32 is forward of the intake opening 31 may be in a range of five percent to 25%, or 12% to 20% of the length of the rear fuselage section. The length of the rear fuselage section is between the front end 18 and the rear end 17 of the rear fuselage section. Moreover, the exhaust opening 32 may be a distance from the rear end 17 in a range of 50% to 15%, or 40% to 20%, or 35% to 25% of the length of the rear fuselage section. Similarly, the air intake opening 31 may be a distance from the rear end 17 in a range of 20% to zero, or 5% to 20% or 10% to 15%.

The air intake opening 31 is located at an area of high dynamic pressure, as shown in FIG. 2 in areas 24 and 23. The air intake opening is at an area of higher dynamic pressure than is the exhaust opening. Exhaust gases passing through the exhaust opening do not flow to areas having higher pressure such as the area having the air intake opening.

Guide vanes 40 may be in the exhaust opening 32, as shown in FIGS. 4 and 5. The guide vanes 40 are adapted to guide the exhaust gases out through the exhaust opening. The guide vanes 40 in the exhaust opening may be used if the air intake opening 31 is sufficiently close to the exhaust opening that there is a significant risk of exhaust gases entering the intake opening. The guide vanes 40 may be configured to direct the exhaust gases to flow longitudinally and/or angularly with respect to the longitudinal axis 39 in a direction away from the air intake opening. Indeed the exhaust gases may be directed by the guide vanes 40 in a direction opposite to the direction of the air intake opening 31. The guide vanes 40 may also enhance laminar flow of the exhaust gases as the gases exit the opening and enter the atmosphere.

The exhaust duct 34 may be short and straight to allow the exhaust gases to flow through the duct, out the exhaust opening 32 and into the atmosphere. A short and straight exhaust duct minimizes pressure losses in the duct and thereby enhances the discharge of exhaust gases. Similarly, the guide vanes 40 promoting laminar flow also minimize pressure losses. Minimizing pressure losses in the exhaust duct improves the performance of the engine by minimizing backpressure on the engine exhaust.

In some embodiments of the invention, the exhaust duct 34 may be inclined at positive or negative angles with respect to a horizontal plane that includes the longitudinal axis 39 of the fuselage. Moreover, the engine 30 may be similarly inclined as shown in FIGS. 4 and 5. A longitudinal axis 38 of the engine may be inclined with respect to the horizontal plane by at least 10 degrees, at least 13 degrees and, for example, as much as 20 or 25 degrees. In contrast, an APU engine is conventionally inclined by only 6 to 8 degrees.

An aerodynamic tail cone 37 is shown in FIGS. 3A, 3B, 4 and 5, and forms the end of the rear fuselage section. The tail cone 37 is shaped to provide good aerodynamic performance at the rear of the fuselage. In some embodiments of the invention, the tail cone does not have an exhaust or air intake opening at the rearmost portion of the tail cone. Thus, the rearmost portion of the tail cone may be shaped to enhance aerodynamic performance and need not be configured to support an opening.

The embodiment shown in FIG. 3A includes a scoop 35 that extends at least partially over the air intake opening 31 and diverts air flowing over the skin of the fuselage into the opening. The scoop 35 may include a panel, e.g. door, having a rear edge attached to the fuselage rearward of the air intake opening and a leading edge extending forward and over the air intake opening. The scoop 35 may pivot to a close position flush with and closing the air intake opening while the engine is not operating.

The embodiment shown in FIG. 3B, shows a flap door 36 associated with the air intake opening 31. The flap door has a closed position shown in FIG. 3B that closes the opening, and an open position in which the door is pivoted to open the opening. The door may be hinged to a forward end of the air intake opening and pivot inward into the air intake duct. The flap door 36 does not protrude beyond the skin surrounding the air intake opening and thus does not contribute drag to the air flowing over the skin.

The scoop 35 and the flap door 36 may be actuated between an open position (respectively outward and inward) in which they allow air to be drawn from the atmosphere by the engine 30, and a closed position in which they close the opening formed by the air intake 31 in the fuselage's skin 15. The closed position is used when the engine is off. In the closed position, the scoop and flap door do not contribute drag to the airflow over the skin surrounding the air intake opening.

FIG. 5 illustrates another embodiment of the invention. This embodiment is similar to that of FIGS. 3a and 4, with an air intake on the port side of the rear fuselage section and a tail cone 37. However it differs in that the exhaust 32 is placed on a lower side of the rear fuselage section. In order to facilitate the gas exhaust through the exhaust 32, and to minimize the energy consumption of the engine 30, the engine is tilted with its front end higher than its rear end. The tilting angle between a longitudinal axis 38 of the engine 30 and a longitudinal axis 39 of the aircraft is of opposite sign compared to the tilting angle formed between the same axes in the embodiment of FIGS. 3a and 4.

Figures 6, 7:
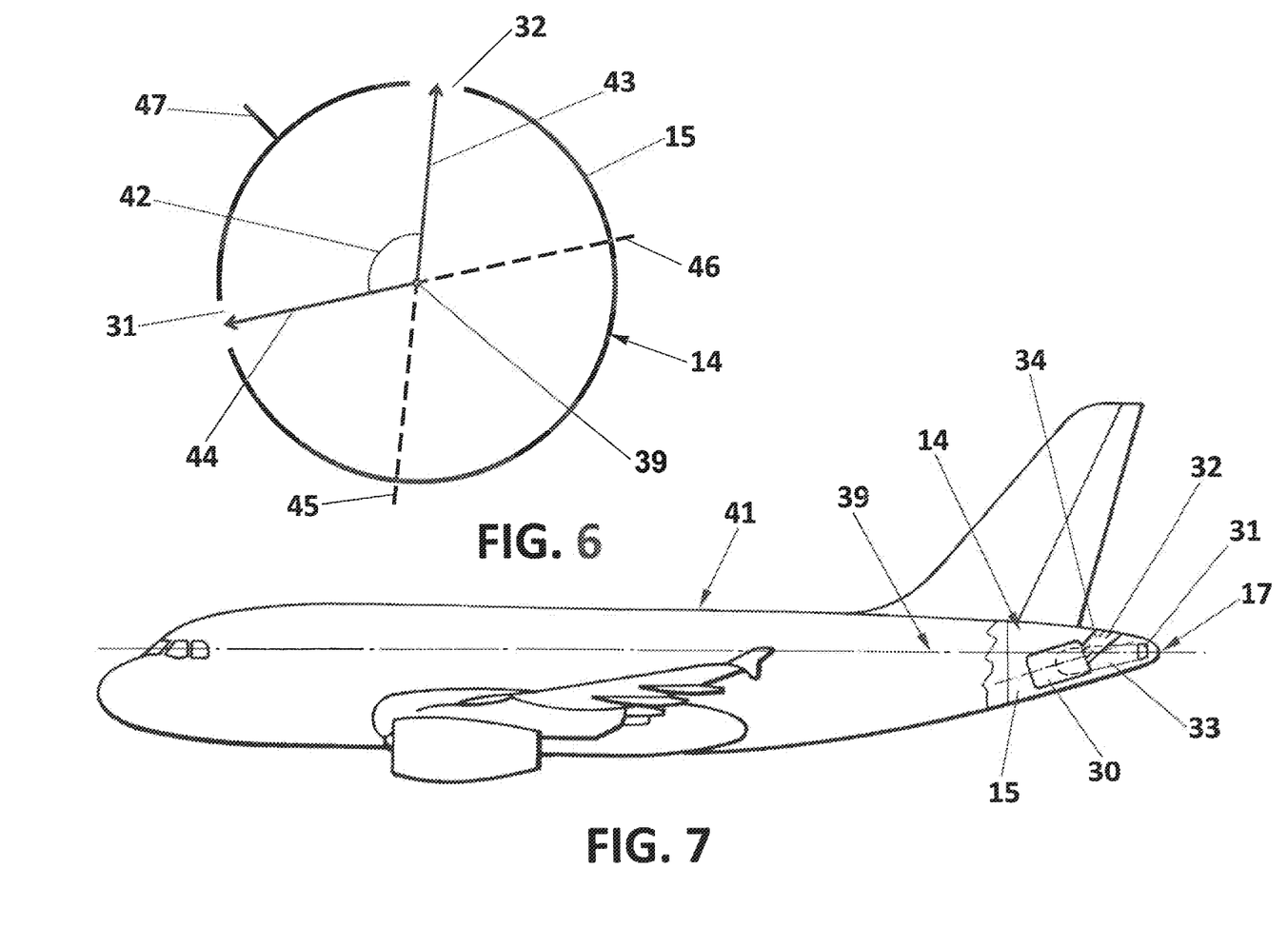
FIG. 6 is a schematic longitudinal view of a rear section fuselage in an embodiment of the invention according to the embodiment of FIG. 4.
FIG. 7 is a schematic representation of an aircraft that embodies the invention.

FIG. 6 represents angular segregation between the air intake opening 31 and the exhaust opening 32 the embodiment of the invention shown in FIG. 4. FIG. 6 shows a schematic cross section of the rear fuselage section that represents the skin 15 as a circle. The air intake opening 31 is shown at about 8:30, if the circle representing the skin is treated as the face of a clock facing rearward of the aircraft. The exhaust opening 32 is at 12:30. FIG. 6 is an applicable representation regardless whether the air intake opening rearward, forward or at the same lateral location along the fuselage length as the exhaust opening.

The longitudinal axis 39 is at the center of the circle shown in FIG. 6. An exhaust vector 43 is from the longitudinal axis 39 to the center of the exhaust opening 32. An air intake vector 44 is from the longitudinal axis 39 to a center of the air intake opening 31.

The angular segregation between the air intake opening 31 and the exhaust opening 32 is represented by angle 42 between the exhaust vector 43 and the air intake vector 44. The angular segregating angle 42 is of more than 85 degrees on this example, for example of about 95 degrees, such as within a range of 70 degrees to 100 degrees, or 80 degrees to 90 degrees.

Rather than vectors, the angular segregation may be defined by a an intake plane 46 which includes the longitudinal axis 39 and a center of the air intake 31 opening, and an exhaust plane 45 which includes the longitudinal axis and a center of the exhaust opening 32.

In addition to the angular segregation, the air intake opening and the exhaust opening may be separated by a physical separator 47 protruding outward from the skin of the fuselage 14. Examples of a physical separator 47 are the vertical tail plane, either of the horizontal tail planes or a fin parallel to the longitudinal axis 39. The physical separator physically separates the exhaust gases from the air intake opening 31.

FIG. 7 shows an aircraft 41 according to the invention is represented with the rear fuselage section shown in cross-section. The rear fuselage section of this aircraft corresponds to the embodiment shown in FIG. 4. The air intake opening 31 is aft of the exhaust opening 32. Both openings are in the tail cone and aft of the vertical and horizontal tail planes. Also, neither opening is at the rear end 17 of the tail cone.

In alternative embodiments not shown in the figures, the intake conduct may have a straight shape, with no curve section, from the air intake to the engine. In such embodiments, in order to minimize the length and weight of the intake conduct, this intake conduct brings air on the same side of the engine as the side of the air intake on the fuselage: for example if the air intake is on a port side, the air conduct brings the air to the port side of the engine.

In alternative embodiments not shown in the figures, the air intake and the exhaust may be on opposite sides, for example: respectively on the port side and on the starboard side of the fuselage, or on the lower side and the upper side of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a fuselage including a rear fuselage section having a skin extending around a circumference of the rear fuselage section, wherein the rear fuselage section includes a rearwardly facing end;
   an engine housed within the rear fuselage section, wherein the engine includes an air intake inlet configured to intake air for combustion in the engine and an exhaust outlet configured to discharge exhaust gases from the engine;
   an air intake duct within the rear fuselage section and configured to direct air into the air intake inlet of the engine;
   an air intake opening in the skin of the rear fuselage section, wherein the air intake is forward of the rearwardly facing end and forms an air inlet to the air intake duct;
   an exhaust duct within the rear fuselage section, having an inlet connected to the exhaust outlet and configured to direct the exhaust gases generated by the engine away from the engine; and
   an exhaust opening in the skin of the rear fuselage section and forming an outlet to the exhaust duct, wherein the exhaust opening is configured to discharge the exhaust gases into atmospheric air adjacent the aircraft;
   wherein the exhaust opening is forward of the rearwardly facing end and forward of the air intake opening along a longitudinal axis of the fuselage, and
   wherein the air intake inlet of the engine is forward in the fuselage of the exhaust outlet of the engine.

2. The aircraft according to claim 1, wherein an exhaust vector is defined by a predetermined point on the longitudinal axis and a center of the exhaust opening, and an intake vector is defined by the predetermined point and a center of the air intake opening, wherein an angle between the exhaust vector and the intake vector is at least 85 degrees and the angle is in a plane perpendicular to the longitudinal axis.

3. The aircraft according to claim 1, wherein an exhaust plane is perpendicular to the longitudinal axis and includes a center of the exhaust opening, and an intake plane is perpendicular to the longitudinal axis and includes a center of the air intake opening, wherein an angle between the exhaust plane and the intake plane is at least 85 degrees.

4. The aircraft according to claim 1, further comprising a physical separator extending outward from the skin between the air intake opening and the exhaust opening.

5. The aircraft according to claim 1, wherein the air intake opening is on a lateral side of the rear fuselage section.

6. The aircraft according to claim 1, wherein the exhaust opening is on an upper side of the rear fuselage section, wherein the upper side is above a horizontal plane that includes the longitudinal axis.

7. The aircraft according to claim 1, further comprising vanes within the exhaust duct and nearer the exhaust opening along a length of the exhaust duct than to the engine, wherein the vanes are configured to direct the exhaust gases through the exhaust opening.

8. The aircraft according to claim 1, wherein the engine is an auxiliary power unit engine housed in an auxiliary power unit chamber within the rear fuselage section.

9. The aircraft according to claim 8, wherein the auxiliary power unit engine has an engine longitudinal axis, and an angle between the engine longitudinal axis and the longitudinal axis of the fuselage is at least ten degrees.

10. The aircraft according to claim 8, wherein a front end of the auxiliary power unit engine is at an elevation within the rear fuselage section higher than an elevation of a rear end of the auxiliary power unit engine.

11. The aircraft according to claim 1, wherein a rear end of the rear fuselage section is closed such that opposing lateral sides of the rear fuselage section meet at the rear end.

12. The aircraft according claim 1, wherein the air intake duct includes a portion having a U-shape, and the air intake opening is aft of an air intake on the engine.

13. A rear fuselage section of an aircraft comprising:
   a skin defining an outer surface of the rear fuselage section;
   a rear end facing rearward of the rear fuselage section;
   an auxiliary power unit engine including an air intake inlet configured to intake air for combustion in the auxiliary power unit engine and a combustion gas discharge aft of the air intake inlet;
   an air intake duct having an outlet connected to a combustion air intake of the auxiliary power unit engine;
   an air intake opening in the skin of the rear fuselage section and forward of the rear end, wherein the air intake opening is an inlet to the air intake duct;
   an exhaust duct having an inlet connected to the combustion gas discharge outlet of the auxiliary power unit engine; and
   an exhaust opening in the skin of the rear fuselage section, wherein the exhaust opening is at an outlet of the exhaust duct,
   wherein the exhaust outlet is forward of the air intake opening and is forward of the rear end along a longitudinal axis of the rear fuselage section.

14. The rear fuselage section of claim 13, wherein the air intake opening is forward of a rearmost end of the rear fuselage section, and the rearmost end of the rear fuselage section is closed such that opposing lateral sides of the rear fuselage section meet at the rearmost end.

15. The rear fuselage section of claim 14, wherein a rearmost edge of the air intake opening is forward of the rearmost end of the rear fuselage section in a range of 5% to 20% of a length of the rear fuselage section along the longitudinal axis.

16. The rear fuselage section of claim 13, wherein the exhaust opening is forward of the air intake opening in a range of 50% to 15% of a length of the rear fuselage section along the longitudinal axis.

17. The rear fuselage section of claim 13, wherein the exhaust opening is offset from the air intake opening by an angle of at least 85 degrees, wherein the angle is in a plane perpendicular to the longitudinal axis.

18. The rear fuselage section of claim 13, further comprising a physical separator extending outward from the skin and between the exhaust opening and the air intake opening.

19. The rear fuselage section of claim 13, wherein the auxiliary power unit engine is a gas turbine engine.

20. The rear fuselage section of claim 13, wherein the air intake opening is at an area of the skin at a higher dynamic air pressure than is the exhaust opening during a cruise flight mode of an aircraft including the rear fuselage section.

* * * * *